(12) United States Patent
Vatanparvar et al.

(10) Patent No.: US 12,440,150 B2
(45) Date of Patent: Oct. 14, 2025

(54) SPEECH-BASED PULMONARY ASSESSMENT

(71) Applicant: SAMSUNG ELECTRONICS CO., LTD, Gyeonggi-Do (KR)

(72) Inventors: Korosh Vatanparvar, Santa Clara, CA (US); Viswam Nathan, Fresno, CA (US); Ebrahim Nematihosseinabadi, Santa Clara, CA (US); Md Mahbubur Rahman, San Jose, CA (US); Tousif Ahmed, San Jose, CA (US); Jilong Kuang, San Jose, CA (US); Jun Gao, Menlo Park, CA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 841 days.

(21) Appl. No.: 17/592,777

(22) Filed: Feb. 4, 2022

(65) Prior Publication Data
US 2022/0257175 A1  Aug. 18, 2022

Related U.S. Application Data

(60) Provisional application No. 63/148,276, filed on Feb. 11, 2021.

(51) Int. Cl.
A61B 5/00 (2006.01)
A61B 5/024 (2006.01)
(Continued)

(52) U.S. Cl.
CPC .......... *A61B 5/4803* (2013.01); *A61B 5/0022* (2013.01); *A61B 5/024* (2013.01);
(Continued)

(58) Field of Classification Search
CPC ..... A61B 5/4803; A61B 5/0022; A61B 5/024; A61B 5/0816; A61B 5/0871; A61B 5/091; A61B 2562/0204; G10L 25/66
See application file for complete search history.

(56) References Cited

U.S. PATENT DOCUMENTS 7,850,619 B2  12/2010 Gavish et al.
10,028,675 B2  7/2018 Patel et al.
(Continued)

FOREIGN PATENT DOCUMENTS

KR  20190113390 A  10/2019
WO  2016028495 A1  2/2016
(Continued)

OTHER PUBLICATIONS

Vatanparvar, K. et al., "SpeechSpiro: Lung Function Assessment from Speech Pattern as an Alternative to Spirometry for Mobile Health Tracking," In 2021 43rd Annual International Conference of the IEEE Engineering in Medicine & Biology Society (EMBC), Nov. 1, 2021 (pp. 7237-7243). IEEE.
(Continued)

Primary Examiner — Devin B Henson
(74) Attorney, Agent, or Firm — Kevin T. Cuenot

(57) ABSTRACT

Pulmonary assessment based on speech can include identifying one or more audio features and speech patterns of a user's speech. A cognitive burden associated with the user's speech can be determined. A pulmonary condition of the user can be determined based on predetermined correlations between the one or more audio features and speech patterns of the user's speech, the cognitive burden, and a respiratory airway condition.

20 Claims, 6 Drawing Sheets

(51) Int. Cl.
   *A61B 5/08* (2006.01)
   *G10L 25/66* (2013.01)
(52) U.S. Cl.
   CPC ............ *A61B 5/0816* (2013.01); *G10L 25/66* (2013.01); *A61B 2562/0204* (2013.01)

(56) References Cited

U.S. PATENT DOCUMENTS

| | | |
|---|---|---|
| 10,796,805 B2 | 10/2020 | Lotan et al. |
| 10,847,177 B2 | 11/2020 | Shallom |
| 11,000,210 B2 | 5/2021 | Artunduaga |
| 2018/0240535 A1 | 8/2018 | Harper et al. |
| 2019/0080803 A1 | 3/2019 | Lotan et al. |
| 2020/0098384 A1 | 3/2020 | Nematihosseinabadi et al. |
| 2020/0118583 A1 | 4/2020 | Shallom |
| 2021/0361227 A1 | 11/2021 | Chou et al. |
| 2024/0049981 A1* | 2/2024 | Berisha .................. G16H 50/20 |

FOREIGN PATENT DOCUMENTS

| | | |
|---|---|---|
| WO | 2018021920 A1 | 2/2018 |
| WO | 2019194843 A1 | 10/2019 |
| WO | 2022173215 A1 | 8/2022 |

OTHER PUBLICATIONS

Fukuda, T. et al., "Detecting breathing sounds in realistic Japanese telephone conversations and its application to automatic speech recognition," Speech Communication, vol. 98, Issue C, Apr. 2018, pp. 95-103.

Ruinskiy, D. et al., "An effective algorithm for automatic detection and exact demarcation of breath sounds in speech and song signals," IEEE Transactions on Audio, Speech, and Language Processing, vol. N5, No. 3, pp. 838-850, 2007.

WIPO Appln. No. PCT/KR2022/001971, Int'l. Search Report, Jun. 7, 2022, 3 pg.

WIPO Appln. No. PCT/KR2022/001971, Written Opinion, Jun. 7, 2022, 4 pg.

EP Appln. No. 22752975.7, Supplementary European Search Report, Jan. 8, 2024, 6 pg.

Chun, K.S. et al., "Towards Passive Assessment of Pulmonary Function from Natural Speech Recorded Using a Mobile Phone," In 2020 IEEE Int'l. Conf. on Pervasive Computing and Communicaitons (PerCom), Mar. 23, 2020, 10 pg.

* cited by examiner

500

| Determine a respiratory airway condition of a user at multiple times over a predetermined time interval
502 |

| Convey a pulmonary assessment to at least one of the user or a healthcare professional in response to detecting a predetermined change in the pulmonary condition of the user during the predetermined time interval
504 |

SPEECH-BASED PULMONARY ASSESSMENT

CROSS-REFERENCE TO RELATED APPLICATIONS

This application claims the benefit of U.S. Provisional Patent Application No. 63/148,276 filed on Feb. 11, 2021, which is incorporated herein by reference in its entirety.

TECHNICAL FIELD

This disclosure relates to diagnosing and treating human health conditions, and more particularly, to diagnosing and treating pulmonary conditions.

BACKGROUND

Two types of pulmonary disorders that impede one's ability to move air in and out of the lung are obstructive disorders and restrictive disorders of the pulmonary airway passages. The airways passages are provided by the bronchi. The primary bronchi in the upper portion of the lungs are tube-like structures that connect to the trachea. Secondary bronchi connect the primary bronchi and tertiary bronchi. The tertiary bronchi connect to the bronchioles—the smallest segments of the bronchi—which provide airflow to the alveoli, which perform gas exchange. An obstructive disorder causes a decreased flow of air owing to obstructive resistance in one or more of these airway passages. A restrictive disorder is characterized by insufficient expansion of the individual's lung tissue and/or chest muscles, which impedes airflow primarily due to reduced lung volumes.

Pulmonary function tests (PFTs) measure lung volume, lung capacity, rates of airflow, and gas exchange. Two widely used methods for performing PFTs are spirometry and plethysmography. Among the measurements obtained from PFTs performed with a spirometer, for example, are forced expiratory volume in one second (FEV1) and forced vital capacity (FVC). FEV1 measures one's ability to expel air from the individual's lungs. FVC measures the amount of air forcibly exhaled from the lungs after inhaling as deeply as the individual is able. The ratio FEV1/FVC (also called the Tiffeneau-Pinelli index) measures the proportion of vital capacity an individual is able to expire in the first second of forced expiration relative to the individual's forced vital capacity.

FEV1, FVC, and FEV1/FVC are strongly affected by any obstruction or restriction of the individual's pulmonary airway passages, and hence, are significant indicators of the individual's pulmonary condition. Accordingly, FEV1, FVC, and FEV1/FVC are PFTs that are frequently performed as a first step in assessing the individual's pulmonary condition.

SUMMARY

In an example implementation, a method can include identifying one or more audio features and speech patterns of a user's speech. The method also can include determining a cognitive burden associated with the user's speech. The method also can include determining a pulmonary condition of the user. The pulmonary condition of the user can be determined based on predetermined correlations between the one or more audio features and speech patterns of the user's speech, the cognitive burden, and a respiratory airway condition.

In another example implementation, a system can include one or more processors configured to initiate operations. The operations can include identifying one or more audio features and speech patterns of a user's speech. The operations also can include determining a pulmonary condition of the user. The operations also can include determining a pulmonary condition of the user. The pulmonary condition of the user can be determined based on predetermined correlations between the one or more audio features and speech patterns of the user's speech, the cognitive burden, and a respiratory airway condition.

In yet another example implementation, a computer program product includes one or more computer readable storage media, and program instructions collectively stored on the one or more computer readable storage media. The program instructions are executable by computer hardware to initiate operations. The operations can include identifying one or more audio features and speech patterns of a user's speech. The operations also can include determining a pulmonary condition of the user. The operations also can include determining a pulmonary condition of the user. The pulmonary condition of the user can be determined based on predetermined correlations between the one or more audio features and speech patterns of the user's speech, the cognitive burden, and a respiratory airway condition.

This Summary section is provided merely to introduce certain concepts and not to identify any key or essential features of the claimed individual matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
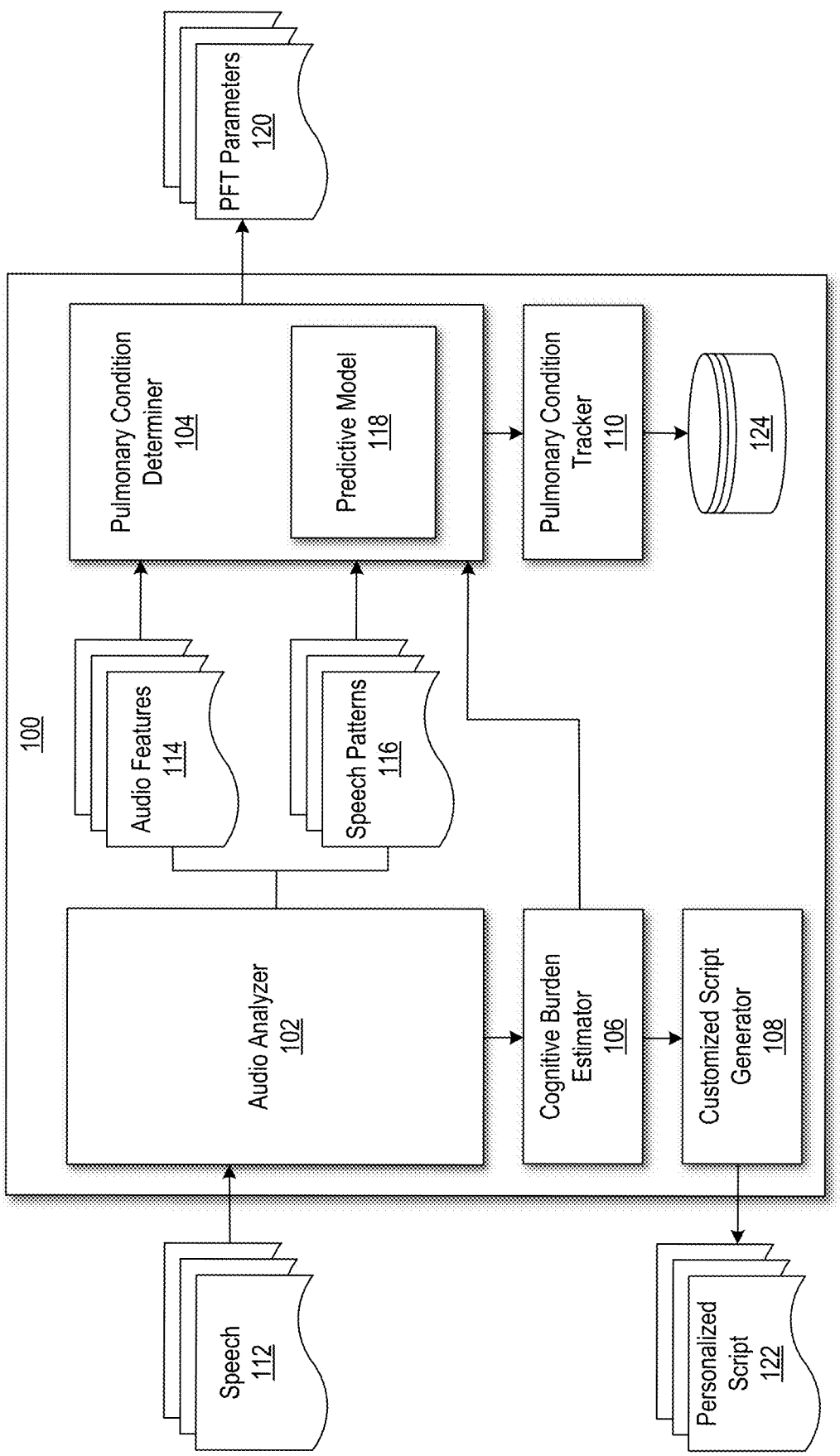
FIG. 1 illustrates an example speech-based pulmonary assessment system.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to diagnosing and treating human health conditions, and more particularly, to diagnosing and treating pulmonary conditions. Pulmonary assessment using conventional techniques typically entails use of an in-office or clinical device such as spirometer for performing one or more PFTs (e.g., FEV1, FVC, FEV1/FVC). Typically, each PFT is performed according to instructions given by a healthcare professional who monitors the in-office or clinical device and who supervises an individual's interaction with the device. Thus, with conventional techniques, the supervision of skilled professional is usually an essential aspect of reliable pulmonary function assessment. Moreover, the conventional techniques nearly universally require that the individual engage in repetitive, exaggerated, and tiring breathing, during which the individual must repeatedly inhale deeply and exhale forcibly. Determining PFT parameters and characteristics by only listening to the speech of an individual has heretofore been extremely challenging if not altogether impossible for even highly skilled healthcare professionals.

In accordance with the inventive arrangements described herein, example methods, systems, and computer program products are provided that are capable of assessing an individual's pulmonary condition based on the individual's ordinary speech. The inventive arrangements include performing an audio analysis of the individual's speech to identify and extract audio features from the individual's speech. Based on machine-determined correlations between the audio features and lung function parameters, the individual's pulmonary condition is determined. The lung function parameters can include FEV1, FVC, and FEV1/FVC, from which pulmonary conditions corresponding to airway obstructions and airway restrictions can be determined.

In certain arrangements, the individual's speech is passively monitored using, for example, a portable device. In other arrangements, the individual reads a prepared script, and a recording of the individual's reading is analyzed. The audio analysis can include annotating or labeling recorded audio segments. The annotation can distinguish speech segments from pauses. The audio features identified and extracted include audio features such as the energy level corresponding to each frequency bin—that is, the intervals between samples in the frequency domain—calculated for a moving frame of audio segments. These spatiotemporal features create a 2D time-series data, which are analyzed to identify patterns correlated with lung function obstruction and based on which lung function parameters are predicted. A predictive model such as machine learning model is used to map the spatiotemporal features to target values of lung function parameters such as FEV1, FVC, or FEV1/FVC, which correspond to the respiratory effort required for ordinary conversational speech or reading a prepared script.

An individual's ordinary speech is produced in the individual's larynx and occurs in three successive stages. Initially, the individual's vocal cords (tissue also known as vocal folds or vocal reeds) vibrate. The vibrations create the sound of the individual's voice. Vocal tract resonators (throat, mouth, and nasal passages) modulate the sound. Finally, vocal tract articulators (tongue, palate, and lips) modify the sound to produce recognizable words of speech.

Pitch and loudness of voice are affected by laryngeal changes and respiratory changes, which tend to co-vary with airflow and subglottal pressure under the influence of the lungs. An increase in airflow from the lungs widens the separation of the vocal cords, which stay apart longer during a vibratory cycle thus increasing the amplitude of the sound pressure wave or loudness. An increase in the frequency of vocal cord vibration, which is affected by the airflow, raises the pitch of the vocalization. Comparable to the expiratory maneuver during a conventional spirometry test, the rate of airflow during ordinary speech decreases as the individual exhales and produces voice sounds. The longer an individual produces voice sounds, the less air remaining in the individual's lungs to provide sufficient subglottal pressure. The volume and pitch of the individual's voice is reduced as a result.

It follows that an underlying pulmonary condition can discernably affect an individual's speech patterns and characteristics. An obstruction in the individual's airways, for example, limits the airflow rate during exhalation when speaking and air intake through inhalation during pauses between speech. Lower and/or inconsistent airflow rates within a speaking session affects the loudness and pitch of the individual's voice, and thereby the individual's speech pattern. An individual afflicted with lung inflammation experiences decreased lung capacity. Low airflow reduces the fundamental frequency of the individual's voice. Inhalation, especially if the individual is wheezing or gasping for air, raises the pitch of the individual's voice. Decreased lung capacity may force the individual to speak in shorter segments and take more frequent pauses between segments, for example, which thus affects the individual's speech patterns.

The more severe an individual's respiratory condition is, the more difficulty the individual will have in maintaining adequate airflow while speaking. Hence, the pitch and loudness of the individual's voice also will be inconsistent and will be affected more significantly. This influence and change in the voice audio characteristics can be observed over the period of a speech and pause segment as the individual is freely speaking with frequent pauses in between.

One aspect of the inventive arrangements disclosed herein is correlating speech patterns (alternating between speaking and pausing for breath) and audio characteristics with the PFT parameters (e.g., FEV1, FVC, and FEV1/FVC) observed through conventional testing, such as professionally monitored, in-clinic spirometry testing with a spirometer. Based on the correlations, an individual's pulmonary condition can be determined. Moreover, an individual afflicted with an airway restriction exhibits airflow patterns during inhalation/exhalation that are notably different from those of an individual afflicted with an airway obstruction. Thus, the determination can include identifying whether the individual is afflicted with one or the other of an airway obstruction or an airway restriction, and if so, how severely.

Accordingly, based on the correlation between audio characteristics and speech patterns and pulmonary functions, the inventive arrangements can predict lung function parameters (e.g., FEV1, FVC, and FEV1/FVC) for an individual based on the patterns and audio characteristics of the individual's speech. Conventional approaches rely primarily on audio features evaluated by analyzing an entire speech session as a whole, using session-level values (e.g., average energy, average shimmer/jitter) to assess a pulmonary condition. An aspect of the inventive arrangements disclosed herein, by contrast, is the detecting during the speech the temporal changes in audio characteristics and evaluating their correlations with the individual's speech. By identifying the temporal changes and correlations in both the time and frequency domains—corresponding to quantitative indicators for speech pattern—the inventive arrangements provide more detailed insight into how airway obstruction impacts human speech so that the speech provides a more reliable predictor of the individual's pulmonary condition.

Another aspect of the inventive arrangements described herein is evaluation of the cognitive burden of the speech that is used to determine an individual's pulmonary condition. The cognitive burden is a quantitative measure of the difficulty of the words and/or grammatical structure of the speech (spontaneous or reading a prepared script), factors that are not related to pulmonary effects on the speech and that as confounding factors can bias or distort the determination of the individual's pulmonary condition. Based on the cognitive burden, a timeseries data derived therefrom are input as an additional feature to the predictive model used to make the determination.

Yet another aspect is the generation of a user-specific script. The script can be generated via a feedback loop to iteratively adjust the script such that when read by an individual the individual exerts sufficient respiratory effort. The respiratory effort can be one that is likely to enable a reliable determination of the individual's pulmonary condition.

Relatedly, still another aspect, is iteratively adjusting a script in accordance with a set of goals (e.g., deeper inhalation, faster exhalation, longer exhalation, or longer breath hold) for the individual to achieve through reading the script as a pulmonary-related exercise. Given the set of goals, a subset of words of specific complexity and length and a subset of sentences of specific grammatical complexity are selected and used to generate a personalized script. The script, for example, can be punctuated to enforce certain break points in the reading of the script aloud so that an individual reading the script aloud will pause for breathing segments at the break points. For example, a minimum loudness can be indicated for certain parts of the script to make the individual speak louder, which can induce a deeper and/or longer exhalation that is consequently followed by deeper inhalation of the individual.

As already noted, the personalized script can cause the individual to expend the maximal respiratory effort, which enhances the likelihood of a reliable determination of the individual's pulmonary condition and related PFT parameters. In another aspect, the personalized script can be read as an exercise to improve the individual's pulmonary condition. The script reading can be a more convenient alternative to traditional breathing exercises for improving the individual's pulmonary condition. For example, exercises based on reading the personalized script aloud can provide greater flexibility. The script-reading exercises are likely to be more effective than conventional breathing exercises in that the script-reading exercises are personalized to each individual's unique pulmonary condition. Reading aloud as an exercise for improving a pulmonary condition can also be more natural for the individual than following a rigid set of breathing exercises.

Further aspects of the inventive arrangements are described below in greater detail with reference to the figures. For purposes of simplicity and clarity of illustration, elements shown in the figures are not necessarily drawn to scale. For example, the dimensions of some of the elements may be exaggerated relative to other elements for clarity. Further, where considered appropriate, reference numbers are repeated among the figures to indicate corresponding, analogous, or like features.

Referring initially to FIG. 1, an example speech-based pulmonary assessment (SBPA) system 100 is depicted. Illustratively, SBPA system 100 includes audio analyzer 102 and pulmonary condition determiner 104. SBPA system 100 optionally can also include one or more of cognitive burden estimator 106, customized script generator 108, and/or pulmonary condition tracker 110.

Operatively, pulmonary condition determiner 104 is capable of determining a user's pulmonary condition based on audio features 114 and speech patterns 116, which are extracted by audio analyzer 104, which analyzes ordinary speech 112 of the user. Pulmonary condition determiner 104 generates one or more data structures comprising feature arrays (vectors, matrices, or higher-order tensors) that are input to predictive model 118. Predictive model 118 can be implemented as a machine learning model that is trained to predict one or more PFT parameters 120 (e.g., FEV1, FVC, FEV1/FVC) based on a correlation between audio features 114 and speech patterns 116 and the PFT parameter(s). Based on the predicted PFT parameters, pulmonary condition determiner 104 can determine respiratory airway conditions of the user. Pulmonary condition determiner 104, accordingly, can determine a likely airway obstruction, airway restriction, or similar such anomaly that may afflict the user.

Optionally, the reliability of the determination made by pulmonary condition determiner 104 can be enhanced by mitigating or eliminating confounding factors that may distort or bias predictive model 118 predictions. The confounding factors are factors that affect speech 112 but are not related to any underlying pulmonary condition of the user. The confounding factors can be due to speech difficulties stemming from a cognitive burden associated with specific words and/or grammatical structure of speech 112. Cognitive burden estimator 106 estimates the cognitive burden associated with speech 112 and, as described below, generates data that is input to predictive model 118 to mitigate or eliminate the confounding factors. Customized script generator 108, as also described below, optionally can generate personalized script 122 that is read by the user, the personalized script 122 specifically tailored to the user to enhance the reliability of the determination of the user's pulmonary condition and/or to be read aloud by the user as an exercise to improve the user's pulmonary condition. Pulmonary condition tracker 110 optionally can track the user's pulmonary condition—whether determined in response to one or more script vocalizations and/or detecting user speech passively monitored over time—to determine changes in the user's pulmonary condition over time. Data pertaining to the user's pulmonary condition as distinct intervals is electronically stored in database 124 and used by pulmonary condition tracker 110 to determine whether a pulmonary condition is stable, improving, or deteriorating over time.

Figure 6:
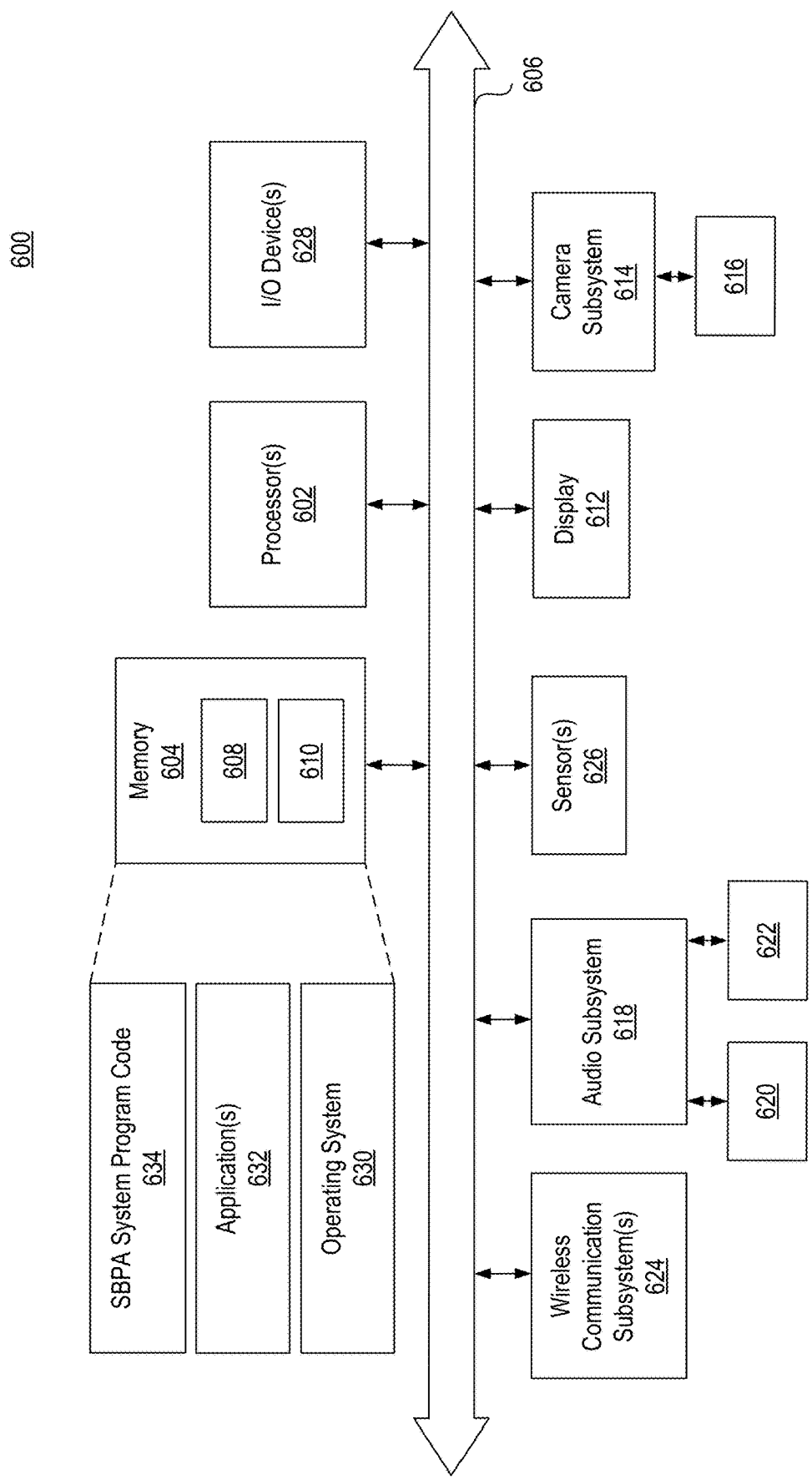
FIG. 6 illustrates an example electronic device.

SBPA system 100, in various arrangements, can be implemented in hardware (e.g., dedicated hardwired circuitry), software (e.g., program code executed by one or more processors), or a combination thereof. For example, SBPA system 100 in certain embodiments is implemented in a device (e.g., smartphone) such as device 600 (FIG. 6). Accordingly, in certain embodiments, SBPA system 100 comprises program code that is electronically stored in a memory, such as memory 604, and executes on one or more processors, such as processor(s) 602 of device 600 (FIG. 6).

In other arrangements, one or more elements of SBPA system 100 can be implemented in one device and operatively coupled to one or more other elements of SBPA system 100 implemented in one or more additional devices. In certain arrangements, a user can access SBPA system 100 using a portable device (e.g., smartphone, smartwatch, or earbuds). The portable device may communicatively couple with SBPA system 100, implemented in a remote device (e.g., cloud-based server), via a wired or wireless connection to a communication network (e.g., the Internet, cellular phone network). The portable device (e.g., smartphone, smartwatch, or earbuds), in certain embodiments, conveys speech 112 to the second device (e.g., cloud-based server), which can implement SBPA system 100 to perform the different functions related to determining the user's pulmonary condition and tracking the condition.

SBPA system 100, as described, assesses the user's pulmonary condition based on speech 112 of the user as captured by the device in which SBPA system 100 is implemented or by a device communicatively coupled with SBPA system 100. Speech 112 can be an audio recording of the user's speech. In certain arrangements, the user will read a passage aloud while the reading is recorded by a device, such as a portable device (e.g., smartphone), thereby generating the audio recording. In other arrangements, speech 112 is an audio recording captured as the user is speaking under ordinary, non-scripted circumstances (e.g., conversation conveyed via a smartphone, smartwatch, or earbuds communicatively coupled to a smartphone).

Audio analyzer 102 processes passively monitored speech or an audio recording to extract audio features 114 and speech patterns 116. The audio features can be extracted by audio analyzer 102 sampling spontaneous speech or an audio recording. In some arrangements, sampling is every 50 ms of audio frames with a sliding window size of 100 ms, and the audio is segmented into 60 s slices (hop length 10 s). Pulmonary condition determiner 104 can generate feature arrays (vectors, matrices, or higher-order tensors) sliced into subsequences, which in some arrangements are of six-second duration and three-second hop length (50% overlap). The feature arrays are input to predictive model 118.

Voice loudness and pitch are correlated with pulmonary conditions such as lung obstruction and restriction, and accordingly, with lung function parameters (e.g., FEV1, FVC, FEV1/FVC). Mel-frequency cepstral coefficients (MFCCs) of the voice represent the signal power in each band of the frequency domain of audio and can comprise the audio features input to predictive model 118. The MFCCs provide measures in the frequency and time domains of voice loudness and pitch for predicting the PFT parameters (e.g., FEV1, FVC, FEV1/FVC) using predictive model 118, which in some embodiments can be implemented as a regression model. Hence, in certain embodiments, audio features 114 comprise MFCCs and pulmonary condition determiner 104 implements sequential modeling and regression to map the sequence or time-series data of MFCC features to each PFT parameter.

In some embodiments, predictive model 118 comprises a hybrid model. A long short-term memory (LSTM) model is a variant of a recurrent neural network (RNN) in which the RNN is endowed with a long short-term memory architecture. The LSTM can capture long-term temporal dependencies in a sequence. The model relies on two sources of information to predict future events. One source is derived from a set of recently observed data. The other is based on a hidden-state space defined by the long short-term memory architecture, which is used to abstract past or contextual information from the data. The LSTM can learn to extract the temporal dependencies and patterns in the MFCC features. For example, a healthy individual can take a deep enough breath before speaking that the individual can continue speaking for a normal duration during each speech segment between pauses. The individual's speech will have a normal, stable voice loudness and pitch. By contrast an individual afflicted with a pulmonary anomaly such as airway obstruction or airway restriction has only limited lung capacity. The individual will have difficulty maintaining speech—which results in shorter speech activity—and will have to take longer and more frequent pauses between speech segments. These temporal dependencies between voice characteristics of speech and pause activities are reflected in MFCC features and are a reliable indicator of an individual's underlying lung condition. The LSTM can learn to identify these temporal dependencies between voice characteristics of speech and pause activities wherein the LSTM input comprises vectors, matrices, or higher-order tensors whose elements include the MFCC features.

Although the LSTM can capture patterns associated with these temporal dependencies, the redundancy inherent in the fully connected layers of the LSTM may not capture spatial dependencies. Convolutional neural networks (CNN) can capture spatial and temporal dependencies for classification, localization, and segmentation of one-dimensional or multi-dimensional data. The CNN architecture is designed such that lower layers capture detailed features and the higher layers extract data that tends to be class-specific information. A CNN can learn the filters that extract characteristics of the data without manually engineering the necessary features. In certain embodiments, a two-dimensional CNN learns and extracts spatial and temporal features in the time-series data extracted from speech. Individuals with a severe pulmonary anomaly (e.g., airway obstruction, airway restriction) have different patterns of voice loudness and pitch values—and, accordingly, different MFCC features—as compared to those of individuals with normally functioning lungs. For an individual suffering a pulmonary anomaly, a determination can be made as to whether the anomaly is an airway obstruction or is an airway restriction based on the respective differences in inhalation/exhalation airflow patterns caused by the different anomalies. The convolutional layers of the CNN can learn and extract these patterns that correlate with individuals' underlying lung conditions.

To take advantage of both models of LSTM and CNN, predictive model 118 is implemented as a hybrid model that contains LSTM layers following the CNN layers. The convolutional layers of the hybrid model can capture localized spatial and temporal patterns in subsequences of the time-series data and map patterns to higher-level localized features, enabling the LSTM layers to identify high-level temporal dependencies in the overall sequence. Implemented as the CNN-LSTM hybrid, predictive model 118 effectively and efficiently learns to reliably model spatiotemporal patterns (e.g., speech patterns and MFCCs) in audio sequences of speech 112.

Audio samples of speech can be collected from multiple individuals to train and validate predictive model 118 implemented as the hybrid CNN-LSTM model. In collecting training data, a sufficiently sized sample of individuals can be selected based on the medical condition (e.g., healthy, COPD- or asthma-afflicted, plagued with persistent cough) and histories of each individual selected. Each selected individual can be asked to read selected text for a predetermined time interval (e.g., one minute, three minutes). The text can be selected based on characteristics such as phonetic richness. The corresponding lung function of each individual can be verified by spirometry using a spirometer under the supervision of a healthcare professional.

In certain arrangements, audio of each recording is sliced into sequences of 60 seconds with a hop length of 10 seconds, and each sequence of 60-second audio is processed to extract a 2D array of time-series features (e.g., MFCC features), the features corresponding to loudness, pitch and a binary activity label indicating whether the sequence is a speech segment or a pause between speech segments. The features are sampled every 50 ms over audio frames with a sliding window size of 100 ms. In other arrangements, audio is sliced into 30-second sequences with hop length of five seconds. Each 30-second sequence is processed to extract a 2D array of time-series features, the features sampled every 50 ms over audio frames with a sliding window of size 200 ms.

Each of the feature arrays is input as an annotated example to train predictive model 118 implemented as a hybrid CNN-LSTM model. To capture the localized spatiotemporal features by the CNN convolutional filters, each 60-second audio and its associated feature arrays are further split into subsequences, $x_t$, with a duration of 6 seconds and hop length of 3 seconds (50% overlap). Hence, each LSTM cell—hidden state, $H_t$, and cell output $C_t$—processes each subsequence to extract localized features and then identify long short-term dependencies over the overall 60 s sequence. A (5, 3) kernel size can be used for 2D convolution filters with single strides. A kernel size of 3 can be used for 1D convolution filters with strides of one. The ReLu activation function can be used for the CNN layers and LSTM cells. Given that the model produces one scalar target output, the LSTM layer only outputs one value, namely, the output of the last cell of the model. A dense layer with a 'tan h' activation function follows the last LSTM layer. The model can be trained using various optimization methods (e.g., Adam optimization). Max pooling and drop out layers can be utilized to avoid model overfitting.

In different arrangements, different parameter values of the model—including, sampling rate, sequence timing, and hop length—can be used, adjusted higher or lower depending on specific circumstances. The particular parameters used in describing the model and the training are only for purposes of illustration.

Figure 2:
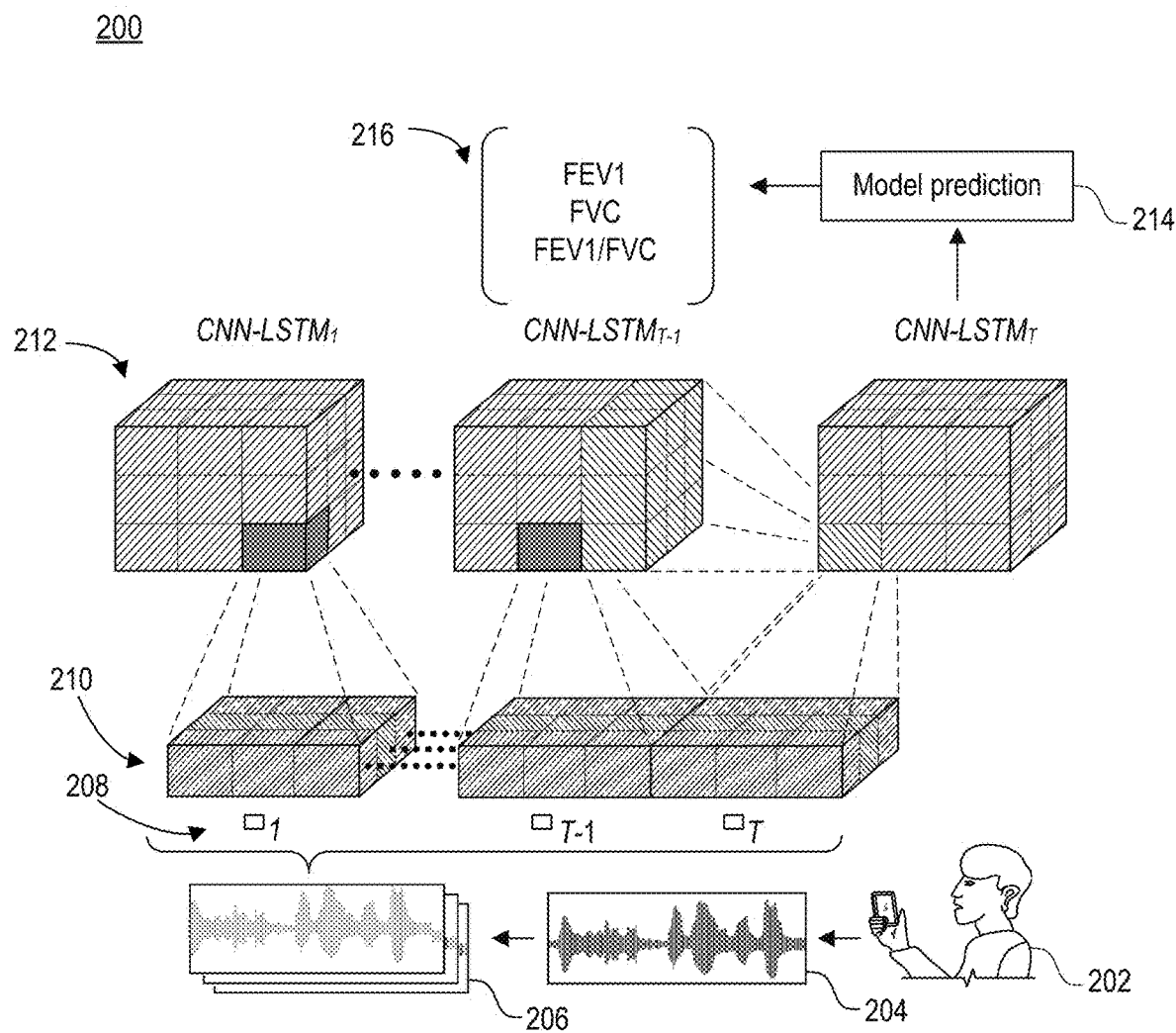
FIG. 2 illustrates an example predictive model implemented by the system of FIG. 1.

Referring additionally to FIG. 2, certain operative aspects 200 of predictive model 118 implemented as a hybrid CNN-LSTM model are schematically illustrated. Illustratively, speech 112 voiced by user 202 generates audio input 204, which is split into segments 206 (e.g., 60-second segments). Audio features are identified and extracted from time-based audio frames 208 to create 2D time series data 210. Time frequency features of 2D time series data 210 can include, for example, MFCCs, which represent audio energy in bins of the frequency domain. Time series vectors of audio features (e.g., MFCCs) can be analyzed to determine temporal changes in voice loudness and pitch for a finer resolution. Each of audio frames 208 can be annotated or labeled to indicate whether it is part of a speech segment or pause segment. The CNN layers of the model are trained to identify and extract spatiotemporal features. For example, a pattern of speech or pause segment can be extracted that correlates with a specific pulmonary condition (e.g., severity of airway obstruction or airway restriction). More detailed speech patterns are captured by the model by inputting smaller samples (e.g., 6-second samples with 50% overlap) into the convolutional filters of the CNN layer. CNN-LSTM layer comprises LSTM cells 212 and is trained to identify temporal dependencies and patterns in speech 112 in its entirety from a sequence of high-level meta features extracted from the CNN layers. The LSTM cells 212 are processed by a dense layer yielding model prediction 214. Model prediction 214 can include predicted PFT parameters 216 (e.g., FEV1, FVC, and FEV1/FVC), whose values indicate one or more specific pulmonary conditions.

Referring still to FIG. 1, pulmonary condition determiner's determination of the user's pulmonary condition based on speech pattern audio feature inputs extracted from speech 112 and input to predictive model 118 can be distorted or biased by certain non-pulmonary factors. The factors can include the cognitive burden associated with speech 112. As defined herein, "cognitive burden" is a quantitative measure of the complexity of speech 112. The greater the complexity of words and/or grammatical structure of speech 112, the more likely it is that pulmonary condition determiner 104's determination of the user's pulmonary condition is adversely affected by these non-pulmonary factors. For example, difficult-to-pronounce words can induce the user to take more frequent pauses between speaking events whenever the user struggles with the pronunciation or may cause the user to change the loudness or pitch if the user is unsure of the pronunciation. For example, a sentence whose grammatical construct is especially complex may require the user to expel air from the user's lung completing the sentence such that other portions of speech 112 seem more labored than might otherwise be the case. Such effects, by mixing non-pulmonary with pulmonary factors, can introduce confounding factors that distort or bias the determination of the user's pulmonary condition by pulmonary condition determiner 104.

Cognitive burden estimator 106 is capable of mitigating or eliminating entirely the bias or distortion caused by the confounding factors of speech complexity in response to detecting that the cognitive burden exceeds a predetermined threshold. The predetermined threshold corresponds to whether the cognitive burden makes it likely that the reliability of the determination by pulmonary condition determiner 104 is not, in a probabilistic sense, sufficiently reliable. Thus, responsive to detecting that the cognitive burden associated with the user's speech exceeds the predetermined threshold, cognitive burden estimator 106 provides a quantitative adjustment input to predictive model 118, which results in a more reliable determination of the user's pulmonary condition by pulmonary condition determiner 104. Operatively, cognitive burden estimator 106 can analyze a script of speech 112. If SBPA system 100 passively monitors the speech of the user, a speech-to-text engine can be integrated in or operatively coupled with SBPA system 100. If speech 112 is a vocalization of a script that the user reads, SBPA system 100 analyzes the prepared script.

In certain embodiments, cognitive burden estimator 106 determines the cognitive burden based on one or more statistics, which can include average word length of sentences, average number of syllables per word, token-per-type ratio, and/or other statistics corresponding to one or more quantitative measures of complexity of speech. If some embodiments, especially for lengthy texts (e.g., more than 100 words), cognitive burden estimator 106 can additionally compute the cognitive burden based, at least in part, on a readability score such as Flesch Reading Ease, Flesch-Kincaid Grade, the Gunning Fox index, or other similar such difficulty score. Additionally, or alternatively, cognitive burden estimator 106 can also base the cognitive burden on lexical diversity of speech 112. Lexical diversity provides a measure of the number of different lexical words of speech 112. Various combinations of the distinct features, f, can be differently weighted and linearly summed to provide a quantitative measure of the cognitive burden, CB, associated with a plurality of sub part, $S_i$, of a script:

$$CB_{S_i} = a_0 f_0 + a_1 f_1 + \cdots + a_n f_n.$$

The linear combinations determined by cognitive burden estimator 106 for each of the subparts of the script can be aggregated into a timeseries of feature data, $D_s$, corresponding to the cognitive burden. The cognitive burden comprising the timeseries, $D_s$, can be input to predictive model 118 implemented by pulmonary condition determiner 104. Based on the quantitative measure of cognitive burden, the confounding effect of speech complexity on one or more of the speech patterns or audio characteristics is mitigated or eliminated entirely. Accordingly, pulmonary condition determiner 104, implementing predictive model 118, can determine the respiratory airway condition to generate a more accurate, more reliable assessment of the pulmonary condition of the user.

Cognitive burden estimator 106 can estimate a cognitive burden for passively monitored speech of the user or speech read aloud by the user from a system-prepared script. The cognitive burden can be estimated by cognitive burden estimator 106 for distinct portions of the speech (e.g., audio recording of passively monitored or scripted speech) used for determining the user's pulmonary condition. For example, a cognitive burden can be estimated for each 10-second portion of a 60-second window of the speech. Cognitive burden estimator 106 can generate for each portion a cognitive burden feature, which pulmonary condition determiner 104 concatenates with other features input as a vector, matrix, or higher-order tensor to predictive model 118 for predicting pulmonary function parameters. Alternatively, based on the cognitive burdens estimated by cognitive burden estimator 106 for each portion, one or more portions of one or more speech segments can be excluded from input to predictive model 118 such that only speech segments that are reliably representative of the user's underlying pulmonary condition are used to determine the user's pulmonary condition.

Although complexity bias or distortion can be mitigated or eliminated entirely by providing to predictive model 118 the cognitive burden determined by cognitive burden estimator 106, customized script generator 108 optionally provides another mechanism to enhance the determination of the user's pulmonary condition. Cognitive burden estimator 106 can analyze a prepared script—if the pulmonary condition is determined based on the user' reading the prepared script—or, if the speech is part of SBPA system 100's passive monitoring of the user, cognitive burden estimator 106 can analyze a text of the speech after conversion by a speech-to-text engine. In either event, based on the analysis by cognitive burden estimator 106, customized script generator 108 generates a script customized for the user.

In certain arrangements, audio analyzer 102 analyzes the user's speech generated from reading a script or passively monitored to determine the sufficiency of the speech in the context of whether the determination rendered by pulmonary condition determiner 104 is reliable. If audio analyzer 102 determines that the user's speech is deficient, then customized script generator 108 is prompted to generate a script or modify an earlier generated one that remediates the deficiency. The words and/or grammatical sentence structure of the newly generated script, for example, can be selected such that the script provides more reliable input. For example, the script may be such that it requires the user to exert greater respiratory effort to read the script aloud. If audio analyzer 102 determines, for example, that the user's vocalization was not loud enough, customized script generator 108 generates a script to induce a louder vocalization by the user.

The script generated by customized script generator 108 reflects the predetermined relationship between speech and pulmonary function parameters, which are correlated to temporal variations (alternating speech segments and pauses), patterns of the speech, and audio characteristics (e.g., MFCCs). Attributes of the script include the specific words of the script, the length of the words, length and grammatical complexity of the sentences, sentence punctuation, breathing pauses, and the like. Such attributes affect how the user vocalizes the script, and consequently, the user's inhalation and exhalation as well as loudness and pitch while reading the script.

Customized script generator 108 can adjust the attributes to enhance the likelihood of a reliable determination of the user's pulmonary condition by pulmonary condition determiner 104 based on the user's reading of the customized script. For example, based on estimated respiratory effort and/or lung function parameters associated with vocalizing the script, customized script generator 108 can adjust the attributes of the script to induce sufficient respiratory effort on the part of the user during the reading. This can enhance the reliability of the determination of the user's pulmonary condition by pulmonary condition determiner 104.

In certain arrangements, customized script generator 108 generates the script by selecting from a predetermined pool of words and sentences having different grammatical structures and breathing points. Customized script generator 108 selects from the pool to generate a script that targets a specific pulmonary aspect, such as inducing the user to exert a maximal respiratory effort, including deep inhalation (DI), rapid exhalation (RE), longer exhalation (LE), and/or longer breath hold (LBH). In some arrangements, SBPA system 100 implements a machine learning model (e.g., logistic regression, decision tree) that—based on estimated lung function parameters associated with the user—identifies one or more specific pulmonary aspects of the user for testing and/or improving through certain exercises. The lung function parameters include FEV1, FVC, and FEV1/FVC. Based on one or more targeted aspect (DI, RE, LE, and/or LBH), customized script generator 108 can select a subset of words and sentences from the pool for generating a targeted script. In one arrangement, SBPA system 100 implements a generative machine learning model to generate the customized script.

SBPA system 100, in different arrangements, can use different scripts generated by customized script generator 106 for testing the user's pulmonary condition. For example, pulmonary condition determiner 104 may determine the user's pulmonary condition by passively monitoring the user's speech conveyed for example over a smartphone, smartwatch, or other user device. Cognitive burden estimator 106 can determine a cognitive burden for the speech. In the event, the cognitive burden exceeds a predetermined threshold, the SBPA system 100 can respond by instructing the user to engage in a test of the user's pulmonary condition. For the text, customized script generator 106 can generate a script whose reading by the user will provide user speech that is more likely to enable pulmonary condition determiner 104 to reliably predict the user's pulmonary condition.

In other arrangements, one or more scripts generated by customized script generator 106 can be generated for improving the user's pulmonary condition by reading the script(s). A script can be generated by customized script generator 106 to cause the maximum respiratory effort the user is capable of expending in reading the script, the respiratory effort determined by one or more predicted PFT parameter values determined by pulmonary condition determiner 104. In certain arrangements, the user's respiratory effort can be gradually increased by reading a succession of scripts, each requiring a greater respiratory effort than a preceding one until the predicted maximum for the user is reached. In other arrangements, a baseline respiratory effort for the user is established, followed over time by scripts newly generated by customized script generator 106 designed to increase the user's pulmonary capabilities through reading the scripts. In still other arrangements, conventional breathing exercises (e.g., pursed lip breathing, coordinated breathing, deep breathing) can be integrated with the script readings to further improve a pulmonary condition of the user.

Optionally, the user's pulmonary condition can be tracked over time by pulmonary condition tracker 110. Pulmonary condition tracker 110 can periodically prompt SBPA system 100 to determine the user's pulmonary condition based on explicit testing or passive monitoring of the user's speech. Time-stamped pulmonary condition indicators (e.g., FEV1, FVC, and FEV1/FVC) determined by pulmonary condition determiner 104 can be electronically stored by pulmonary condition tracker 110 in database 124. Pulmonary condition tracker 110 can determine changes in the user's pulmonary condition over time.

The change in the user's pulmonary condition detected by pulmonary condition tracker 110 can indicate a deteriorating pulmonary condition. The deterioration can be indicated by a change in one or more predicted PFT parameter values determined by pulmonary condition determiner 104. For example, one or more values of FEV1, FVC, or FEV1/FVC may persistently decline for a predetermined interval, or one or more of the values may fall below a predetermined baseline value.

In certain arrangements, pulmonary condition tracker 110 conveys information (e.g., notification) in response to detecting a change in the user's pulmonary condition. Information can be conveyed audibly or visually to the user via a device (e.g., smartphone, smartwatch, computer) in which SBPA system 100 is implemented or that communicatively couples with another device (e.g., cloud-based server) in which SBPA system 100 is implemented.

Figure 3:
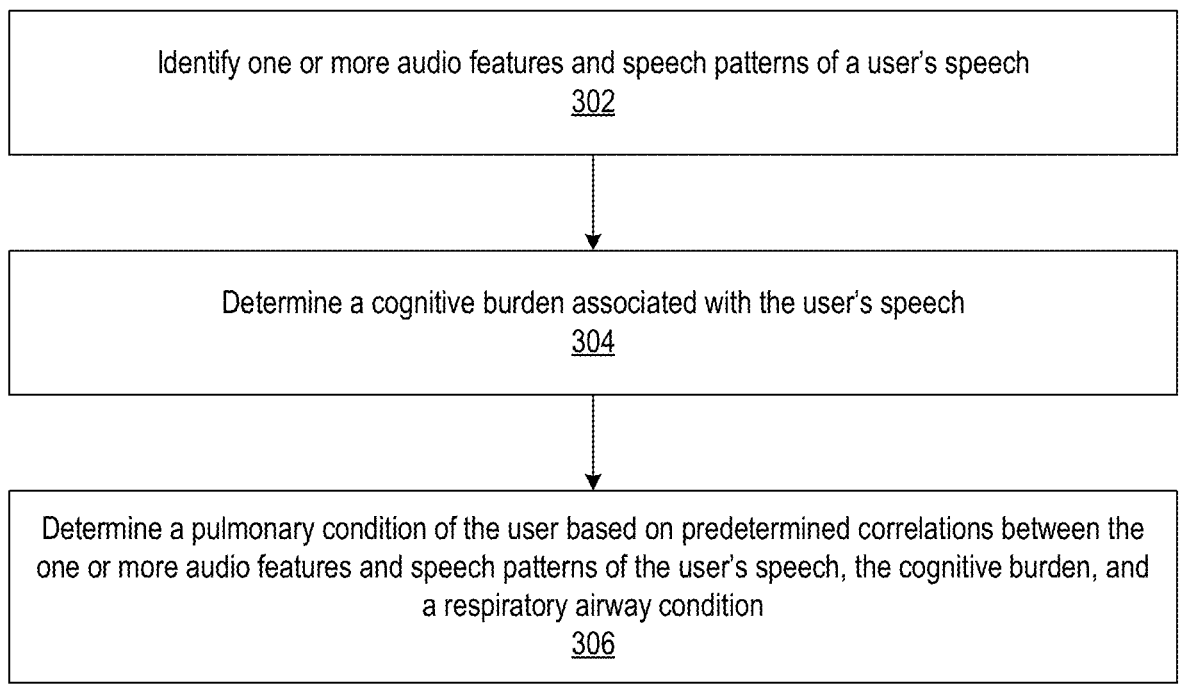
FIG. 3 is a flowchart of an example method of determining the pulmonary condition of an individual based on the individual's speech.

FIG. 3 illustrates example method 300 capable of determining a pulmonary condition of a user based on the user's speech. Method 300 can be performed using one or more devices that implements or operatively couple with an SBPA system as described herein (collectively "the system").

At block 302, the system identifies one or more audio features and speech patterns of a user's speech. In certain embodiments, the one or more audio features and speech patterns of a user's speech are identified by an audio analyzer implemented by the system. The user's speech in some arrangements is a vocalization of a customized script read by and specific to the user. In other arrangements, the user speech is speech passively monitored by the system.

At block 304, the system can estimate a cognitive burden associated with the user's speech. The system can estimate the cognitive burden based on one or more statistics. The statistics can include an average word length of sentences, an average number of syllables per word, a token-per-type ratio, and/or other statistics that provide one or more quantitative measures of speech complexity. The system additionally can compute the cognitive burden based, at least in part, on a readability score (e.g., Flesch Reading Ease, Flesch-Kincaid Grade, Gunning Fox index) or similar such difficulty score. Additionally, or alternatively, the system can determine the cognitive burden, at least in part, on the lexical diversity of the speech, which provides a measure of the number of different words of the speech.

The system can estimate a cognitive burden for passively monitored speech of the user or speech read aloud by the user from a system-prepared script. The cognitive burden can be assessed and quantified by the system for distinct portions of an audio recording of the speech used for determining the user's pulmonary condition. For example, a cognitive burden can be determined for each 10-second portion of a 60-second window of the speech. A corresponding cognitive burden feature can be generated and concatenated with other temporal features input to a predictive model that predicts pulmonary function parameters. Alternatively, based on the cognitive burden corresponding to a specific speech portion, the speech portion can be excluded from the system-performed speech analysis such that only portions of speech segments that are reliably representative of the user's underlying pulmonary condition are used to determine the user's pulmonary condition.

At block 306, the system determines a pulmonary condition of the user. The pulmonary condition can be determined by the system based on predetermined correlations between the one or more audio features and speech patterns of the user's speech and a respiratory airway condition. In certain embodiments, the correlations with the respiratory airway condition determine one or more lung function parameters. The lung function parameters can include one or more of the PFT parameters FEV1, FVC, and/or FEV1/FVC. The system, based on lung function parameters, is capable of identifying an airway anomaly, such as an airway obstruction or airway restriction afflicting the user. The system can mitigate or eliminate confounding factors based on the cognitive burden. Data generated by the system in response to the cognitive burden can be used by the system to enhance the reliability of the determination by mitigating or eliminating the confounding factors.

Optionally, the system can generate the script specific to the user based on system-determined lung function parameters of the user. The script can be generated to yield specific audio features and/or speech patterns when read aloud by the user. The script can be adjusted to remove confounding factors. In some arrangements the script is generated to be read aloud as an exercise to improve the user's lung functioning. A succession of scripts can be iteratively generated, with each designed to elicit a greater pulmonary effort than previously exerted by the user in reading the scripts. The succession of scripts can be successively generated and read aloud by the user until the user's respiratory effort reaches a predetermined level.

Figure 4:
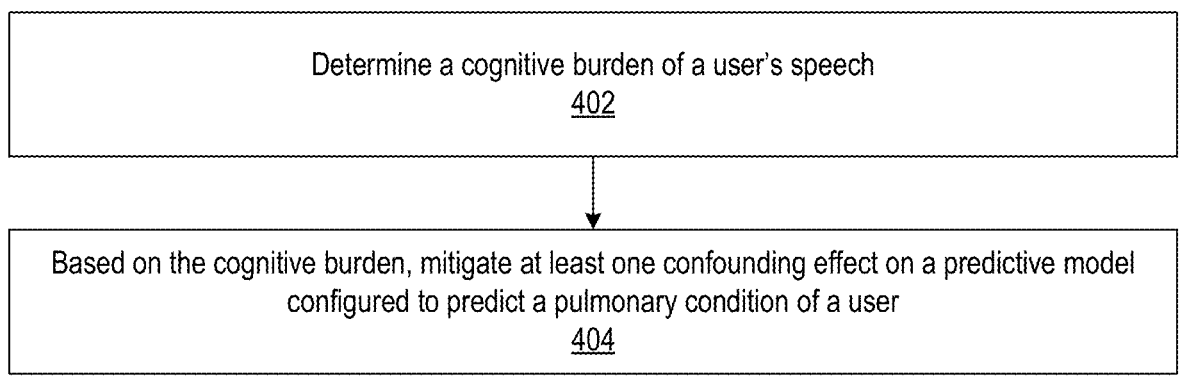
FIG. 4 is a flowchart of an example method of mitigating the influence of confounding factors on the predictive model of FIG. 2.

FIG. 4 illustrates example method 400. Method 400 can be performed using one or more devices that implements or operatively couple with an SBPA system as described herein (collectively "the system").

At block 402, the system can determine a cognitive burden associated with a user's speech. The cognitive burden can be determined based on one or more statistics corresponding to the speech. The statistics can include average word length of sentences of the speech, average number of syllables per word in the speech, token-per-type ratio, and/or other statistics corresponding to one or more quantitative measures of the complexity of the speech. A difficulty measure or metric associated with the speech and used to determine the cognitive burden can include a readability score such as Flesch Reading Ease, Flesch-Kincaid Grade, the Gunning Fox index, or similar such score.

At block 404, the system can mitigate, or eliminate, confounding influences of the cognitive burden on a predictive model used to determine a pulmonary condition of a user. The system based on the cognitive burden can generate timeseries data that is input into the predictive model. Based on the input, the system can mitigate or eliminate the confounding influences on the predictive model.

Figure 5:
FIG. 5 is a flowchart of an example method of informing an individual of the result of a pulmonary assessment based on multiple determinations of the respiratory airway condition of the individual.

FIG. 5 illustrates example method 500. Method 500 can be performed using one or more devices that implements or operatively couple with an SBPA system as described herein (collectively "the system").

At block 502, the system determines a respiratory airway condition of a user at multiple times over a predetermined time interval. The system, in some embodiments, generates time-stamped pulmonary condition indicators determined by the system. The pulmonary condition indicators can include values of PFT parameters (e.g., FEV1, FVC, and FEV1/FVC) determined based on speech of the user tested periodically or passively monitored over time. The system can electronically store the pulmonary condition indicators in a database.

At block 504, the system conveys a pulmonary assessment to the user and/or a healthcare professional in response to detecting a predetermined change in the pulmonary condition of the user during the predetermined time interval. The change in the user's pulmonary condition can indicate a deteriorating pulmonary condition. The deterioration can be indicated by a consistent deterioration in one or more of the pulmonary condition indicators (e.g., FEV1, FVC, and/or FEV1/FVC) over a predetermined interval. The deterioration can be indicated by or one or more of the pulmonary condition indicators (e.g., FEV1, FVC, and/or FEV1/FVC) falling below a predetermined baseline value.

FIG. 6 illustrates an example device 600. Device 600 includes one or more processors 602 coupled to memory 604 through interface circuitry 606. Device 600 stores computer readable instructions (also referred to as "program code") within memory 604, which is an example of computer readable storage media. Processor(s) 606 execute the program code accessed from memory 604 via interface circuitry 606.

Memory 604 can include one or more physical memory devices such as local memory 608 and bulk storage device 610, for example. Local memory 608 is implemented as one or more non-persistent memory device(s) generally used during actual execution of the program code. Local memory 608 is an example of a runtime memory. Examples of local memory 608 include any of the various types of RAM suitable for use by a processor for executing program code. Bulk storage device 610 is implemented as a persistent data storage device. Examples of bulk storage device 610 include a hard disk drive (HDD), a solid-state drive (SSD), flash memory, a read-only memory (ROM), an erasable programmable read-only memory (EPROM), electrically erasable programmable read-only memory (EEPROM), or other suitable memory. Device 600 can also include one or more cache memories (not shown) that provide temporary storage of at least some program code in order to reduce the number of times program code that must be retrieved from a bulk storage device during execution.

Examples of interface circuitry 606 include, but are not limited to, an input/output (I/O) subsystem, an I/O interface, a bus system, and a memory interface. For example, interface circuitry 606 can be implemented as any of a variety of bus structures and/or combinations of bus structures including a memory bus or memory controller, a peripheral bus, an accelerated graphics port, and a processor or local bus.

In one or more example implementations, processor(s) 602, memory 604, and/or interface circuitry 606 are implemented as separate components. Processor(s) 602, memory 604, and/or interface circuitry 606 may be integrated in one or more integrated circuits. The various components in device 600, for example, can be coupled by one or more communication buses or signal lines (e.g., interconnects and/or wires). Memory 604 may be coupled to interface circuitry 606 via a memory interface, such as a memory controller or other memory interface (not shown).

Device 600 can include one or more displays. Illustratively, for example, device 600 includes display 612 (e.g., a screen). Display 612 can be implemented as a touch-sensitive or touchscreen display capable of receiving touch input from a user. A touch sensitive display and/or a touch-sensitive pad is capable of detecting contact, movement, gestures, and breaks in contact using any of a variety of avail, able touch sensitivity technologies. Example touch sensitive technologies include, but are not limited to, capacitive, resistive, infrared, and surface acoustic wave technologies, and other proximity sensor arrays or other elements for determining one or more points of contact with a touch sensitive display and/or device.

Device 600 can include camera subsystem 614. Camera subsystem 614 can be coupled to interface circuitry 606 directly or through a suitable input/output (I/O) controller. Camera subsystem 614 can be coupled to optical sensor 616. Optical sensor 616 can be implemented using any of a variety of technologies. Examples of optical sensor 616 can include, but are not limited to, a charged coupled device (CCD) or a complementary metal-oxide semiconductor (CMOS) optical sensor. Optical sensor 616, for example, can be a depth sensor. Camera subsystem 614 and optical sensor 616 are capable of performing camera functions such as recording or capturing images and/or recording video.

Device 600 can include an audio subsystem 618. Audio subsystem 618 can be coupled to interface circuitry 606 directly or through a suitable input/output (I/O) controller. Audio subsystem 618 can be coupled to a speaker 620 and a microphone 622 to facilitate voice-enabled functions, such as voice recognition, voice replication, digital recording, and telephony functions.

Device 600 can include one or more wireless communication subsystems 624. Each of wireless communication subsystem(s) 624 can be coupled to interface circuitry 606 directly or through a suitable I/O controller (not shown). Each of wireless communication subsystem(s) 624 is capable of facilitating communication functions. Examples of wireless communication subsystems 624 can include, but are not limited to, radio frequency receivers and transmitters, and optical (e.g., infrared) receivers and transmitters. The specific design and implementation of wireless communication subsystem 624 can depend on the particular type of device 600 implemented and/or the communication network(s) over which device 600 is intended to operate.

As an illustrative and non-limiting example, wireless communication subsystem(s) 624 may be designed to operate over one or more mobile networks, WiFi networks, short range wireless networks (e.g., a Bluetooth), and/or any combination of the foregoing. Wireless communication subsystem(s) 624 can implement hosting protocols such that device 600 can be configured as a base station for other wireless devices.

Device 600 may include one or more sensors 626, each of which can be coupled to interface circuitry 606 directly or through a suitable I/O controller (not shown). Examples of sensor(s) 626 that can be included in device 600 include, but are not limited to, a motion sensor, a light sensor, and a proximity sensor to facilitate orientation, lighting, and proximity functions, respectively, of device 600. Other examples of sensors 626 can include, but are not limited to, a location sensor (e.g., a GPS receiver and/or processor) capable of providing geo-positioning sensor data, an electronic magnetometer (e.g., an integrated circuit chip) capable of providing sensor data that can be used to determine the direction of magnetic North for purposes of directional navigation, an accelerometer capable of providing data indicating change of speed and direction of movement of device 600 in 3D, and an altimeter (e.g., an integrated circuit) capable of providing data indicating altitude.

Device 600 further may include one or more input/output (I/O) devices 628 coupled to interface circuitry 606. I/O device(s) 628 can be coupled to interface circuitry 606 either directly or through intervening I/O controllers (not shown). Examples of I/O devices 628 include, but are not limited to, a track pad, a keyboard, a display device, a pointing device, one or more communication ports (e.g., Universal Serial Bus (USB) ports), a network adapter, and buttons or other physical controls. A network adapter refers to circuitry that enables device 600 to become coupled to other systems, computer systems, remote printers, and/or remote storage devices through intervening private or public networks. Modems, cable modems, Ethernet interfaces, and wireless transceivers not part of wireless communication subsystem(s) 624 are examples of different types of network adapters that may be used with device 600. One or more of I/O devices 628 may be adapted to control functions of one or more or all of sensors 626 and/or one or more of wireless communication subsystem(s) 624.

Memory 604 stores program code. Examples of program code include, but are not limited to, routines, programs, objects, components, logic, and other data structures. For purposes of illustration, memory 604 stores an operating system 630 and application(s) 632. In addition, memory 604 can store SBPA system program code 634 for implementing an SBPA system, such as SBPA system 100 (FIG. 1).

Device 600 is provided for purposes of illustration and not limitation. A device and/or system configured to perform the operations described herein can have a different architecture than illustrated in FIG. 6. The architecture can be a simplified version of the architecture described in connection with FIG. 6 that includes a memory capable of storing instructions and a processor capable of executing instructions. In this regard, device 600 may include fewer components than shown or additional components not illustrated in FIG. 6 depending upon the particular type of device that is implemented. In addition, the particular operating system and/or application(s) included can vary according to device type as can the types of I/O devices included. Further, one or more of the illustrative components can be incorporated into, or otherwise form a portion of, another component. For example, a processor may include at least some memory.

Device 600 can be implemented as a data processing system, a communication device, or other suitable system that is suitable for storing and/or executing program code.

Device 600 can be implemented as an edge device. Example implementations of device 600 can include, but are not to limited to, a smartphone, smartwatch, or other mobile or wearable computing device. In other example implementations, operations comparable to those described with respect to device 600 also can be implemented in other computing devices. Other computing devices include, for example, a computer (e.g., desktop, laptop, tablet computer).

The terminology used herein is for the purpose of describing particular embodiments only and is not intended to be limiting. Notwithstanding, several definitions that apply throughout this document are expressly defined as follows.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The different types of memory, as described herein, are examples of a computer readable storage media. A non-exhaustive list of more specific examples of a computer readable storage medium may include: a portable computer diskette, a hard disk, a random-access memory (RAM), a read-only memory (ROM), an erasable programmable read-only memory (EPROM or Flash memory), a static random-access memory (SRAM), a portable compact disc read-only memory (CD-ROM), a digital versatile disk (DVD), a memory stick, a floppy disk, or the like.

As defined herein, "data processing system" means one or more hardware systems configured to process data, each hardware system including at least one processor programmed to initiate operations and memory.

As defined herein, "execute" and "run" comprise a series of actions or events performed by the processor in accordance with one or more machine-readable instructions. "Running" and "executing," as defined herein refer to the active performing of actions or events by the processor. The terms run, running, execute, and executing are used synonymously herein.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "individual" and "user" each refer to a human being.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "responsive to" and similar language as described above, (e.g., "if," "when," or "upon,") mean responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, "server" means a data processing system configured to share services with one or more other data processing systems. Relatedly, "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television, and the like. In one or more embodiments, the various user devices described herein may be client devices. Network infrastructure, such as routers, firewalls, switches, access points and the like, are not client devices as the term "client device" is defined herein.

As defined herein, "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the present disclosure. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may specify state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In this way, operatively coupling the processor to program code instructions transforms the machine of the processor into a special-purpose machine for carrying out the instructions of the program code. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of the inventive arrangements. In this regard, each block in the flowcharts or block diagrams may represent a module, segment, or portion of instructions, which comprises one or more executable instructions for implementing the specified operations. In some alternative implementations, the operations noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

The description of the embodiments provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the embodiments disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A computer-based method, comprising:
   extracting from a user's speech, using computer hardware, audio features including Mel-frequency cepstral coefficients (MFCCs) specifying speech patterns of the user's speech;
   calculating, by the computer hardware, a metric specifying cognitive burden associated with the user's speech based on at least one of complexity of words or grammatical structure of the user's speech; and
   determining, by the computer hardware, a pulmonary condition of the user by processing the audio features and the metric of cognitive burden through a predictive model including one or more first convolutional neural network layers trained to extract spatiotemporal features pertaining to airway anomalies and one or more second long short-term memory layers trained to correlate the spatiotemporal features with lung functions.

2. The method of claim 1, further comprising:
   generating a customized script specific to the user, wherein the user's speech is a vocalization of the customized script.

3. The method of claim 1, further comprising:
   generating a customized script specific to the user, wherein the customized script comprises words and grammatical structure selected based on a likelihood of causing the user to improve the pulmonary condition in response to multiple readings of the customized script by the user.

4. The method of claim 1, further comprising:
   determining a respiratory airway condition of the user multiple times over a predetermined time interval; and
   conveying a pulmonary assessment to at least one of the user or a healthcare professional in response to detecting a predetermined change in the pulmonary condition of the user during the predetermined time interval.

5. The method of claim 1, further comprising:
   determining whether the pulmonary condition of the user corresponds to an airway anomaly of the user, wherein the airway anomaly includes at least one of an airway obstruction or an airway restriction.

6. The method of claim 1, wherein
   determining the pulmonary condition of the user comprises determining one or more lung function parameters.

7. The method of claim 6, wherein
   the one or more lung function parameters include at least one of an estimated forced expiratory volume in one second (FEV1) of the user or a forced vital capacity (FVC) of the user.

8. A system, comprising:
   one or more processors configured to initiate operations including:
      extracting from a user's speech audio features including Mel-frequency cepstral coefficients (MFCCs) specifying speech patterns of the user's speech;
      calculating a metric specifying cognitive burden associated with the user's speech based on at least one of complexity of words or grammatical structure of the user's speech; and
      determining a pulmonary condition of the user by processing the audio features and the metric of cognitive burden through a predictive model including one or more first convolutional neural network layers trained to extract spatiotemporal features pertaining to airway anomalies and one or more second long short-term memory layers trained to correlate the spatiotemporal features with lung functions.

9. The system of claim 8, wherein the processor is configured to initiate operations further including:
   generating a customized script specific to the user, wherein the user's speech is a vocalization of the customized script.

10. The system of claim 8, wherein the processor is configured to initiate operations further including:
    generating a customized script specific to the user, wherein the customized script comprises words and grammatical structure selected based on a likelihood of causing the user to improve the pulmonary condition in response to multiple readings of the customized script by the user.

11. The system of claim 8, wherein the processor is configured to initiate operations further including:
    determining a respiratory airway condition of the user multiple times over a predetermined time interval; and
    conveying a pulmonary assessment to at least one of the user or a healthcare professional in response to detecting a predetermined change in the pulmonary condition of the user during the predetermined time interval.

12. The system of claim 8, wherein the processor is configured to initiate operations further including:
    determining whether the pulmonary condition of the user corresponds to an airway anomaly of the user, wherein the airway anomaly includes at least one of an airway obstruction or an airway restriction.

13. The system of claim 8, wherein
    determining the pulmonary condition of the user comprises determining one or more lung function parameters.

14. A computer program product, the computer program product comprising:
one or more computer-readable storage media and program instructions collectively stored on the one or more computer-readable storage media, the program instructions executable by a processor to cause the processor to initiate operations including:
extracting from a user's speech audio features including Mel-frequency cepstral coefficients (MFCCs) specifying speech patterns of the user's speech;
calculating a metric specifying cognitive burden associated with the user's speech based on at least one of complexity of words or grammatical structure of the user's speech; and
determining a pulmonary condition of the user by processing the audio features and the metric of cognitive burden through a predictive model including one or more first convolutional neural network layers trained to extract spatiotemporal features pertaining to airway anomalies and one or more second long short-term memory layers trained to correlate the spatiotemporal features with lung functions.

15. The computer program product of claim 14, wherein the program instructions are executable by the processor to cause the processor to initiate operations further including:
generating a customized script specific to the user, wherein the user's speech is a vocalization of the customized script.

16. The computer program product of claim 14, wherein the program instructions are executable by the processor to cause the processor to initiate operations further including:
generating a customized script specific to the user, wherein the customized script comprises words and grammatical structure selected based on a likelihood of causing the user to improve the pulmonary condition in response to multiple readings of the customized script by the user.

17. The computer program product of claim 14, wherein the program instructions are executable by the processor to cause the processor to initiate operations further including:
determining a respiratory airway condition of the user multiple times over a predetermined time interval; and
conveying a pulmonary assessment to at least one of the user or a healthcare professional in response to detecting a predetermined change in the pulmonary condition of the user during the predetermined time interval.

18. The computer program product of claim 14, wherein the program instructions are executable by the processor to cause the processor to initiate operations further including:
determining whether the pulmonary condition of the user corresponds to an airway anomaly of the user, wherein the airway anomaly includes at least one of an airway obstruction or an airway restriction.

19. The computer program product of claim 14, wherein determining the pulmonary condition of the user comprises determining one or more lung function parameters.

20. The computer program product of claim 19, wherein the one or more lung function parameters include at least one of an estimated forced expiratory volume in one second (FEV1) of the user or a forced vital capacity (FVC) of the user.

* * * * *